May 8, 1951 D. C. HARVEY 2,552,275
CAMERA OF THE REFLEX TYPE FOR MAKING RAPID EXPOSURES
Filed Oct. 1, 1946 12 Sheets-Sheet 4

Douglass C. Harvey
INVENTOR
BY
ATTORNEYS

May 8, 1951  D. C. HARVEY  2,552,275
CAMERA OF THE REFLEX TYPE FOR MAKING RAPID EXPOSURES
Filed Oct. 1, 1946  12 Sheets-Sheet 6

Douglass C. Harvey
INVENTOR

BY
ATTORNEYS

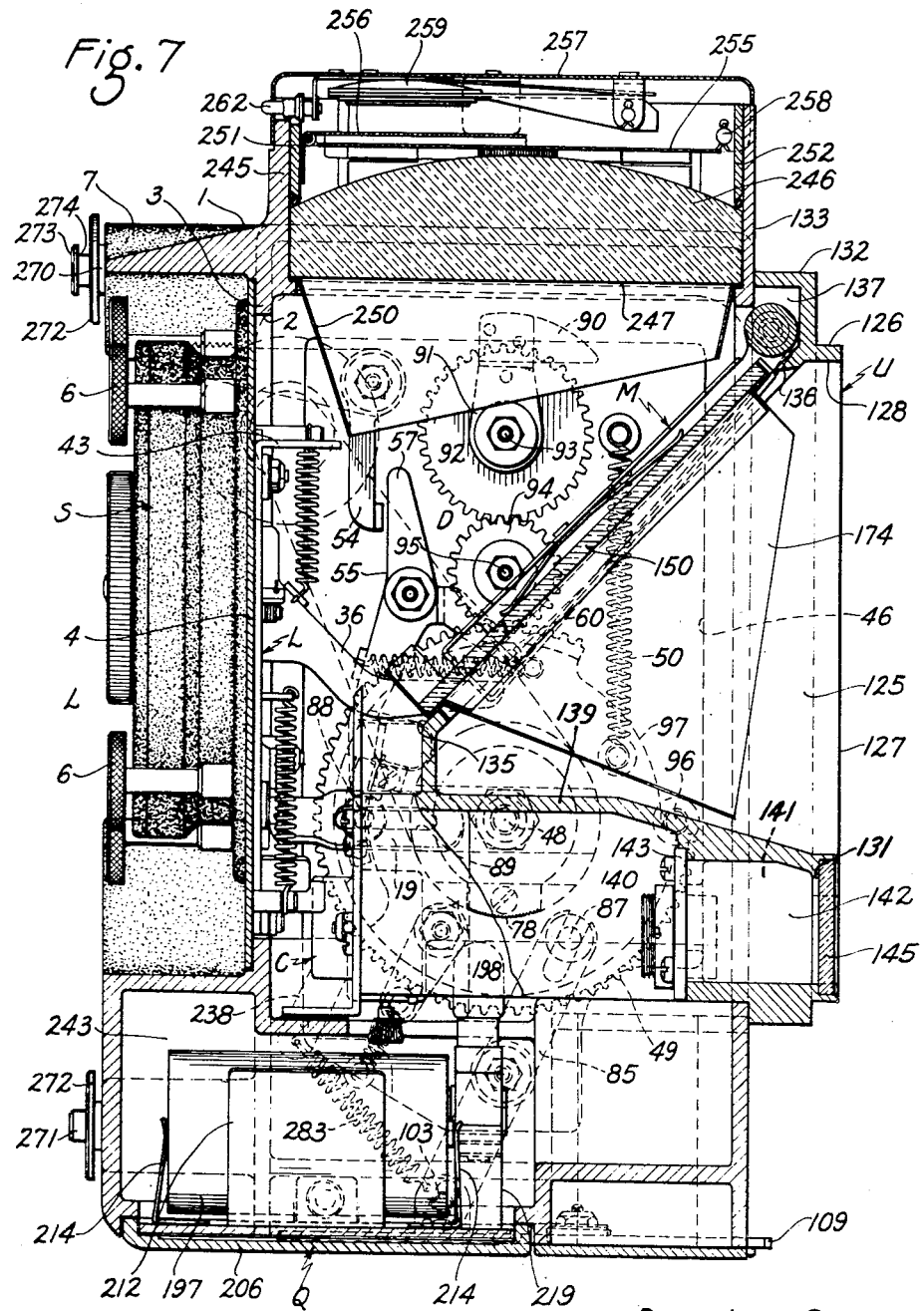

May 8, 1951  D. C. HARVEY  2,552,275
CAMERA OF THE REFLEX TYPE FOR MAKING RAPID EXPOSURES
Filed Oct. 1, 1946  12 Sheets-Sheet 8
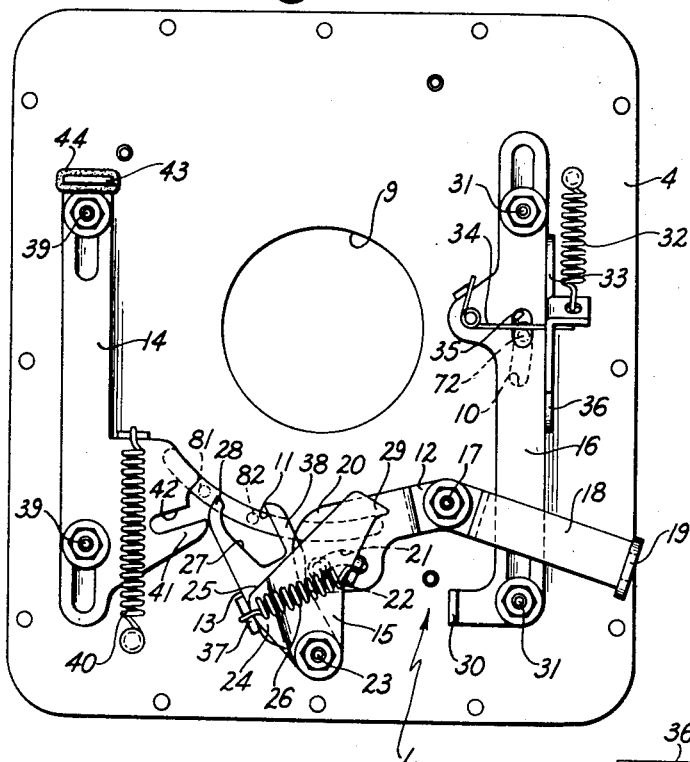
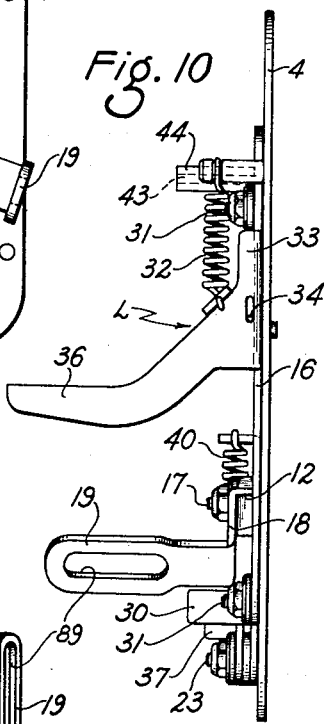
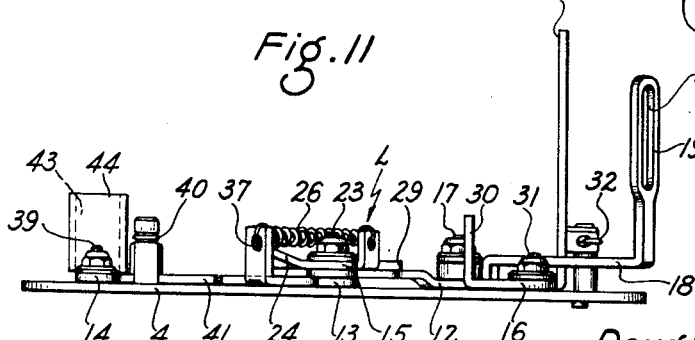
Douglass C. Harvey
INVENTOR
BY
ATTORNEYS

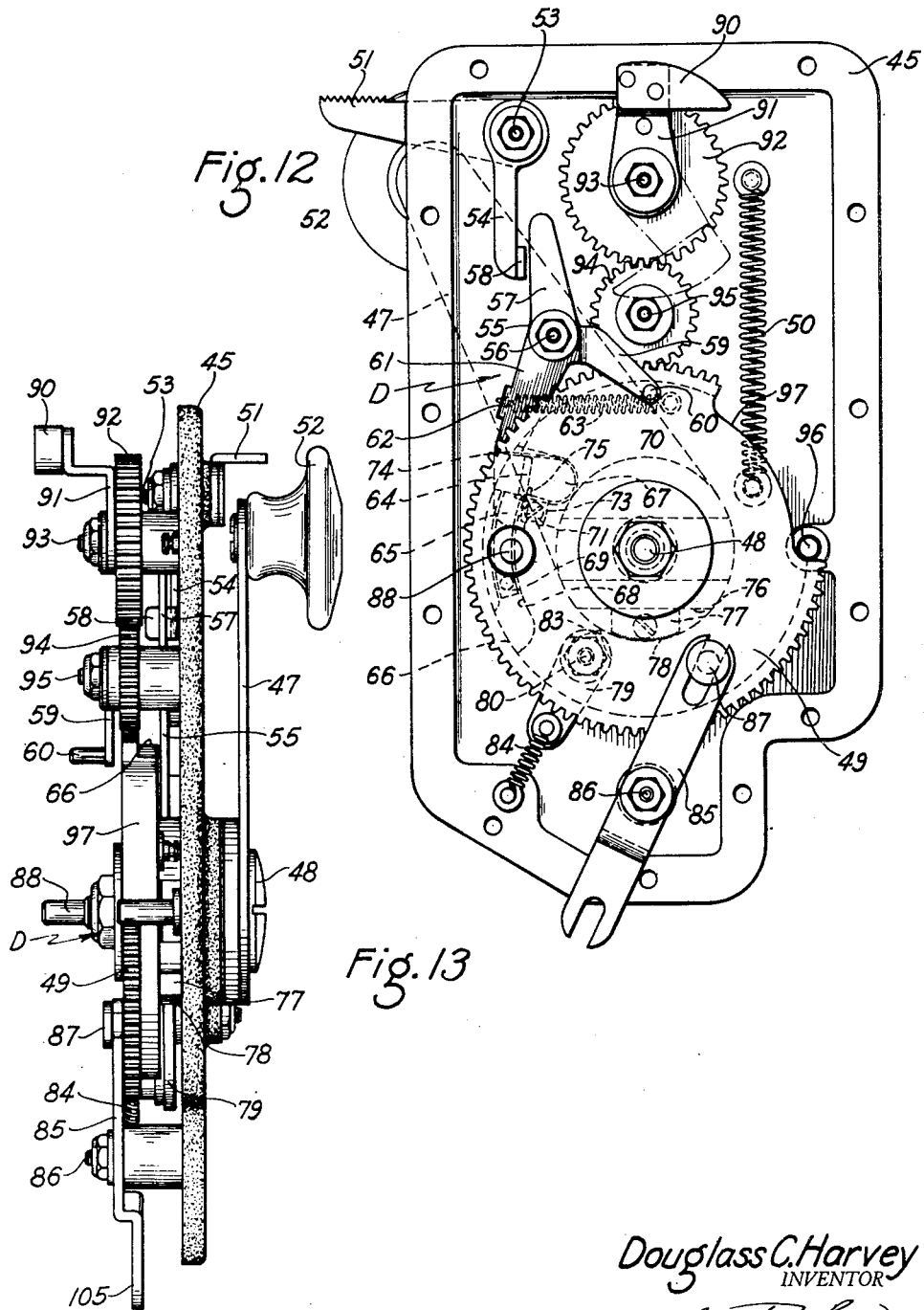

May 8, 1951 D. C. HARVEY 2,552,275
CAMERA OF THE REFLEX TYPE FOR MAKING RAPID EXPOSURES
Filed Oct. 1, 1946 12 Sheets-Sheet 10
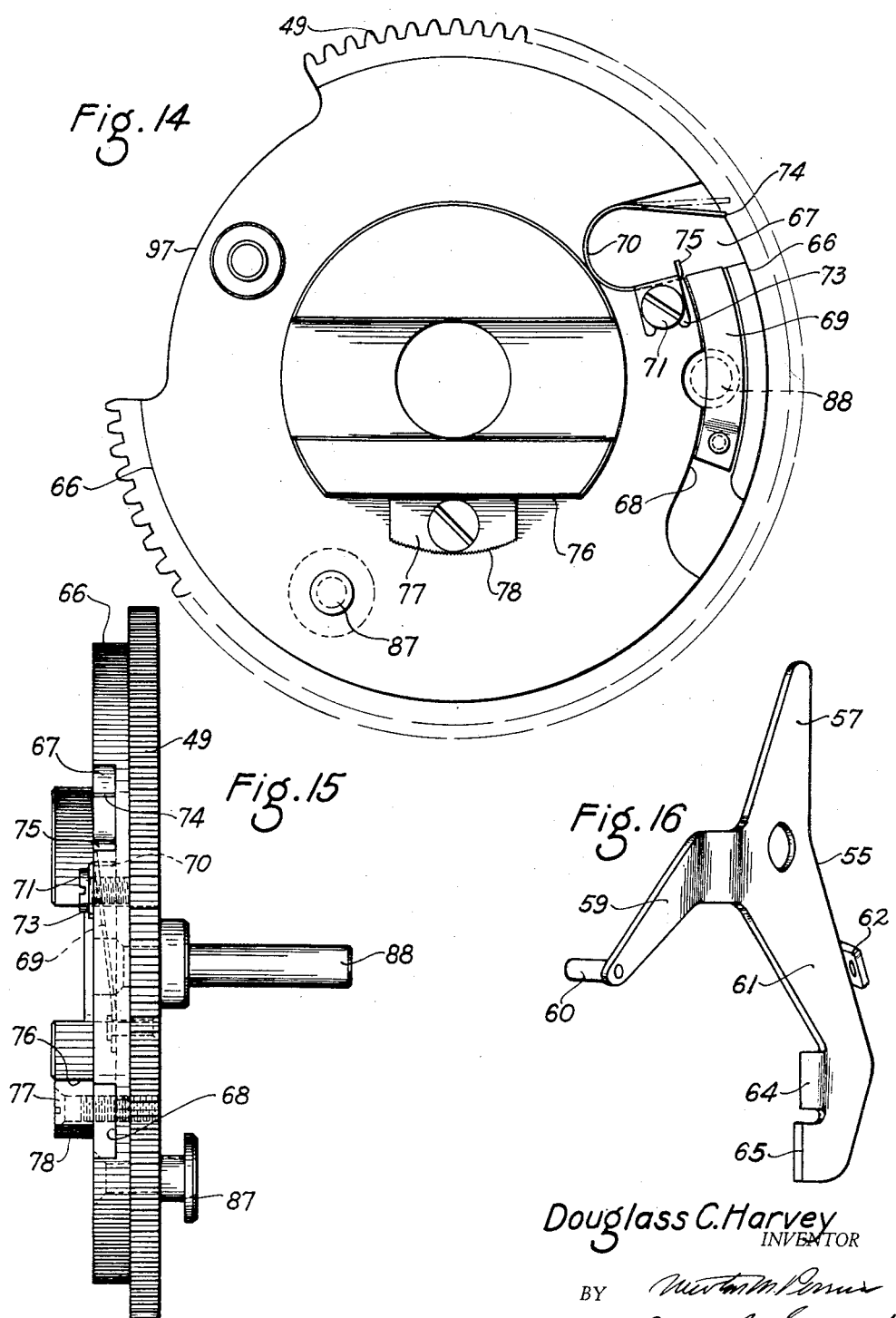
Douglass C. Harvey
INVENTOR
BY
ATTORNEYS

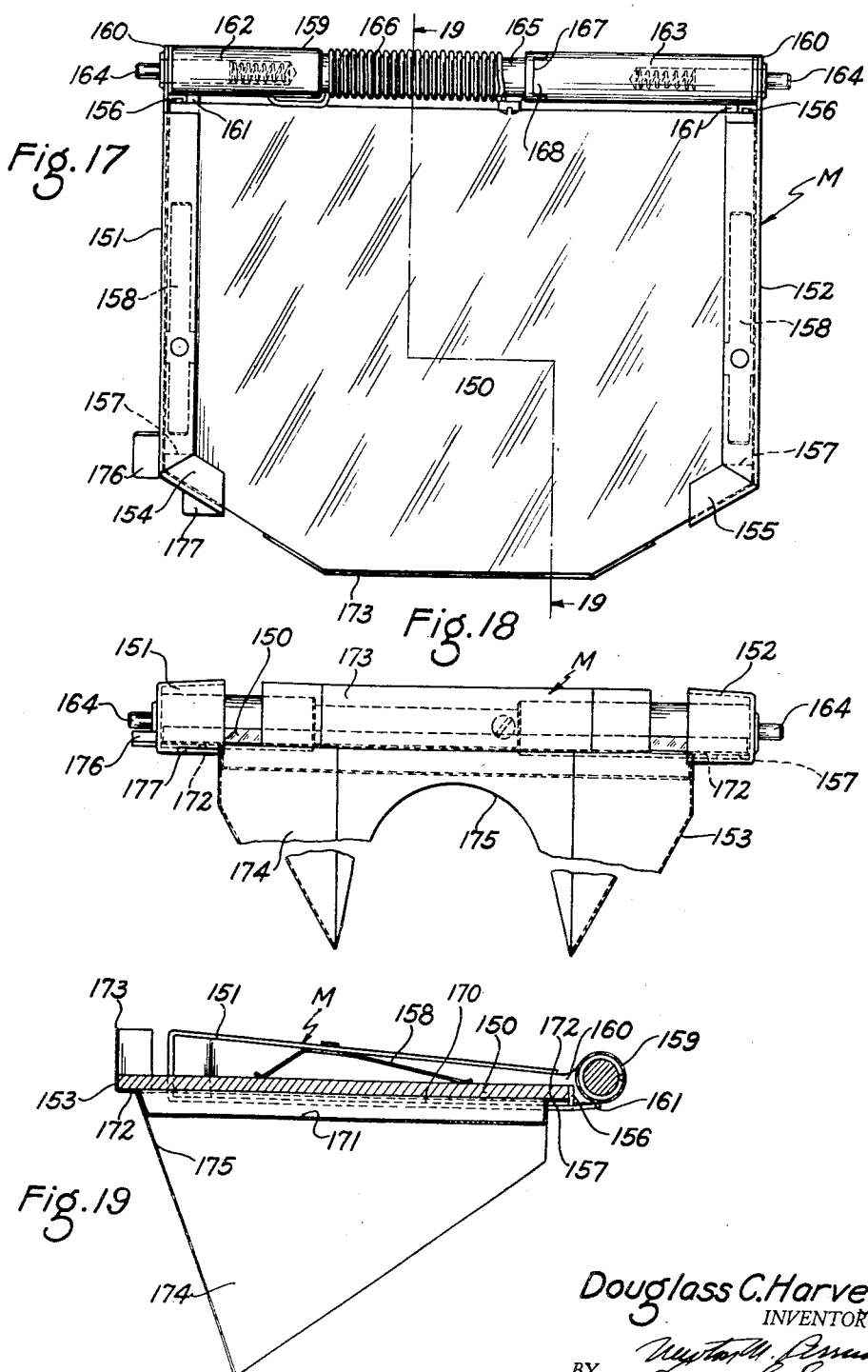

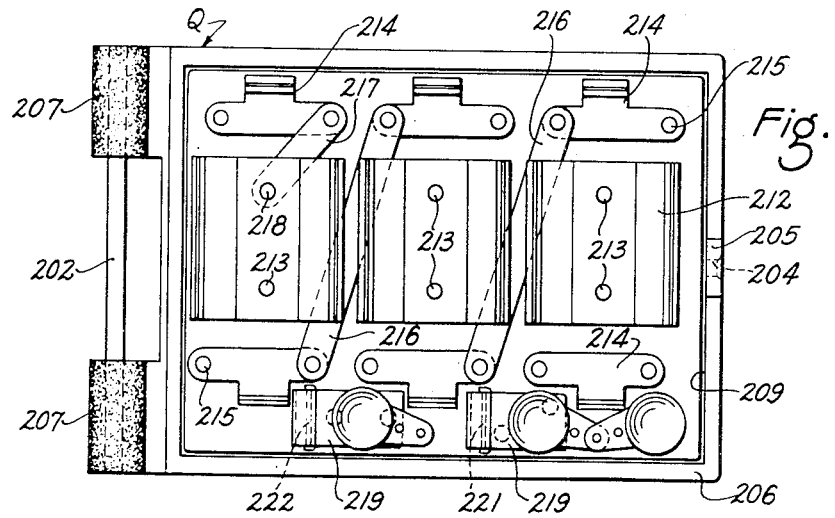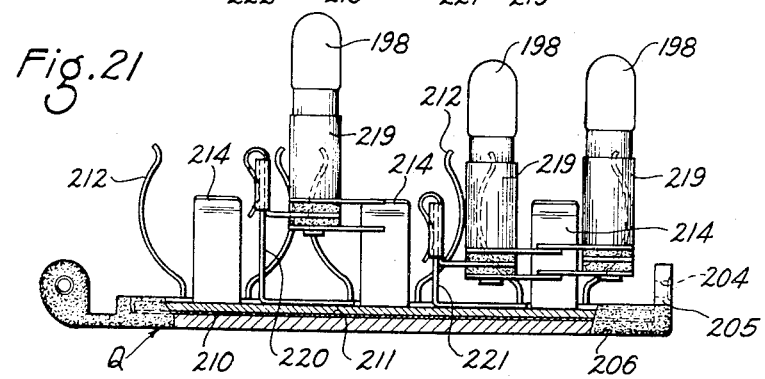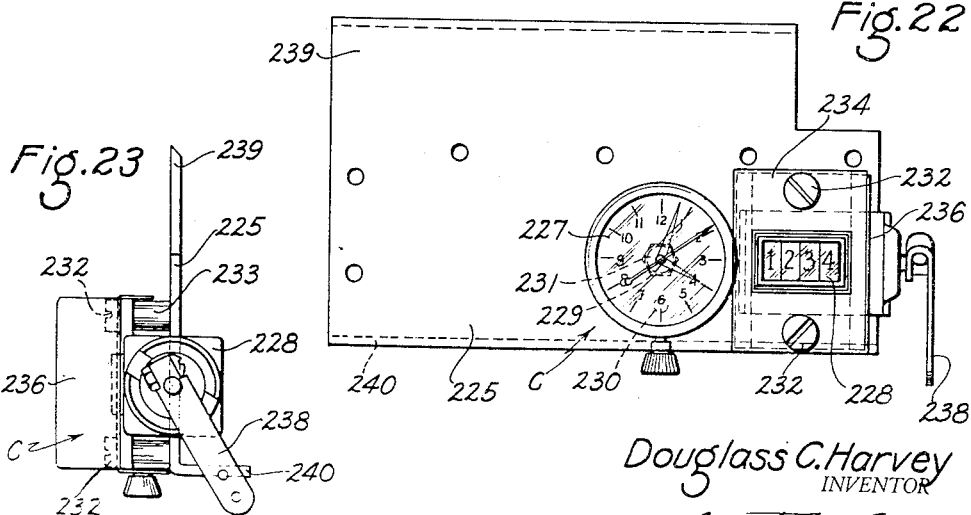

Patented May 8, 1951

2,552,275

UNITED STATES PATENT OFFICE 2,552,275

CAMERA OF THE REFLEX TYPE FOR MAKING RAPID EXPOSURES

Douglass C. Harvey, Rochester, N. Y., assignor to Eastman Kodak Company, Rochester, N. Y., a corporation of New Jersey Application October 1, 1946, Serial No. 700,560

16 Claims. (Cl. 95—42)

This invention relates to photography and more particularly to a camera of the well-known reflex type.

The primary object of my invention is to provide a camera of the reflex type in which the sequence of operations can be performed with a minimum number of motions and controls in order to obtain a maximum number of exposures per minute.

Another object of my invention is to provide a camera of the reflex type in which a single means uncovers the field lens for viewing, opens the shutter leaves for viewing, closes the shutter leaves, operates a switch included in a lamp circuit, trips the shutted, and recovers the field lens in a proper sequence of operation.

A further object of my invention is to provide a camera of the reflex type in which a single operating means moves a mirror from an inoperative position to a viewing position during one portion of a cycle and moves an area of unexposed film into position during the remainder of the cycle.

A still further object of my invention is to provide a camera of the reflex type in which a double exposure prevention device cooperates with the single operating means whereby the single operating means must complete a full cycle of operation before the shutter can be tripped.

Another object of my invention is to provide a camera of the reflex type in which pertinent data, the time, and a negative number will be exposed to the film after the shutter release has been actuated but before the shutter has been tripped for exposing the film.

And still another object of my invention is to provide a camera of the reflex type which can utilize either a magazine for strip film or a film holder containing cut film.

And yet another object of my invention is to provide a camera of the reflex type in which an interchangeable shutter and lens may be readily mounted on the camera without necessitating any preliminary focusing adjustments.

Still another object of my invention is to provide a camera of the reflex type in which a field lens having a fine ground surface is utilized to obtain a bright image for viewing.

And still another object of my invention is to provide a camera of the reflex type which can be easily assembled and readily serviced in the field and which is sturdy and rugged in operation.

These and other objects will appear from the following specification, the novel features being particularly pointed out in the claims at the end thereof.

For rapidly recording a series of scenes or events, it is desirable to reduce the camera operations to a minimum. In known types of cameras three distinct and separate time-consuming motions must be made by the operator in order to expose the film; first, the shutter had to be set; secondly, an unexposed area of film had to be wound into position; and then, before tripping the shutter, the operator had to ascertain whether or not the picture desired was still in the field of view. This procedure did not lend itself very readily to the making of exposures in very rapid succession as would be necessary for highly specialized types of work where large negatives for contact prints or large scale enlargements are required.

In the present instance, the reflex-type camera which I have invented overcomes all of the above-mentioned difficulties and fulfills all of the requisites set forth. A single operating member sets the shutter, presents the field of view to the operator, and winds an unexposed area of film into position in a single cycle of operation. The shutter tripping lever is so positioned adjacent the operating member that the operator does not have to remove his hand therefrom. With this arrangement, an experienced operator is able to make more than one exposure per second. The rapidity of operation permits the making of exposures which slightly overlap when used for mapping, thereby fulfilling a necessary requisite for making a good mosaic picture from the negatives. Further, the camera is so designed that either a magazine or a film holder can be used and interchanged very quickly; this is also true of the lens and shutter which can be replaced as a unit in event of failure with very little loss of time.

These and other advantages will be apparent from the drawings and specification in which like reference characters refer to like parts throughout and in which:

Fig. 7 is a vertical section through the camera showing the general arrangement of the various parts;

Fig. 9 is a front elevation of the front plate assembly which supports the linkage for actuation of the shutter;

Fig. 10 is a side elevation of the front plate and shutter linkage system assembly;

Fig. 11 is an end elevation of the front plate and shutter linkage system assembly;

Fig. 12 is a front elevation of the mechanism plate assembly which carries the means for actuating the shutter linkage system, the release means, the mirror actuating means, the driving connection for advancing the film, the means for preventing double exposure, and the operating means;

Fig. 13 is a side elevation of the mechanism plate assembly;

Fig. 14 is a detail rear elevation view of the drive gear assembly carried by the mechanism plate;

Fig. 15 is a side elevation of the main drive gear assembly;

Fig. 16 is a detail perspective view of the interlock and release lever;

Fig. 17 is a plan view of the mirror carrier assembly;

Fig. 18 is a front elevation of the mirror carrier assembly;

Fig. 19 is a vertical section of the mirror carrier assembly taken on the line 19—19 of Fig. 17;

Fig. 20 is a plan view of the battery cover assembly showing the manner in which the batteries are mounted and connected and the position of the lamps;

Fig. 21 is a front elevation of the battery cover assembly;

Fig. 22 is a front elevation of the watch and counter plate assembly; and

Fig. 23 is a side elevation of the watch and counter plate assembly.

Figure 1:
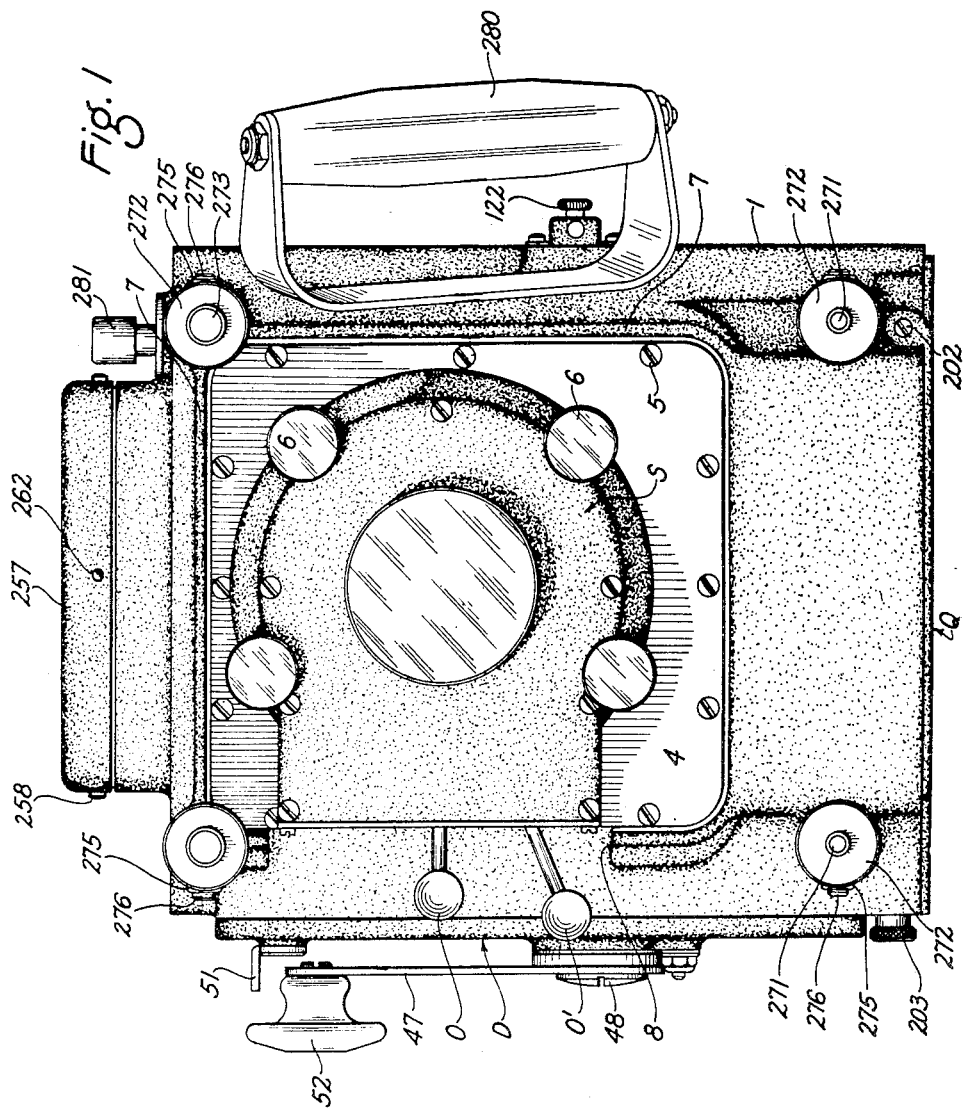
Fig. 1 is a front elevation of the reflux-type camera.

My camera consists broadly of a housing and a mirror supporting and locating means which together comprise the camera body and in which the various actuating mechanisms are contained. The relation between the outer surface of the front plate and the film plane, as established by the rear surface of the mirror supporting and locating means, is held to very exact tolerances to permit ease of assembly and interchanging of the objective and shutter. The camera body is provided with latch members which permit the rapid interchange of magazines and cut-film holders. Such a cut-film holder may be of the type described in my copending application, Serial No. 589,321, filed April 20, 1945, and which issued on December 9, 1947, into U. S. Patent 2,432,414, and is entitled Photographic Plate Holder. The camera is provided with a protective casing for shutters which is preferably constructed in accordance with my copending application Serial No. 599,339, filed June 14, 1945, and which issued on April 6, 1948, into U. S. Patent 2,439,087. The magazine may be of any well-known structure utilizing a one way clutch and does not necessarily constitute a part of the present invention.

The camera consists of a housing 1, see Fig. 7, which is provided with an aperture 2 in the front wall 3. A plate 4 is secured to the wall 3 by the screws 5 and has mounted thereon the objective and shutter assembly S, referred to above, which is secured by the knurled studs 6. The housing 1 has a flange 7 extending from the wall 3 around three sides of the housing 1 to provide a well for the shutter S and to protect the shutter against water, moisture, dust and dirt. My second mentioned copending application discloses the shutter and protective casing in detail. The flange 7 is provided with a cut-out portion 8 to permit the setting of the shutter speed and the diaphragm opening by the operating arm O and O', respectively, see Figs. 1 and 2.

The plate 4, Fig. 9, has an aperture 9 for the shutter assembly S and has mounted thereon a linkage system for the operation of the shutter. The plate 4 is also provided with slots 10 and 11 which permit the pins 72, 81, and 82, which are carried by the shutter assembly S, to extend therethrough. The shutter operating linkage assembly L, see Figs. 9–11, comprises the actuating lever 12, the shutter setting lever 13, the shutter tripping lever 14, the blade operating lever 15 and the blade actuating lever 16. The actuating lever 12 is pivotally mounted to plate 4 by the stud 17 and has an arm 18 which has formed at right angles thereto a slotted arm 19, the purpose of which will be described hereinafter. A second arm 20 on the lever 12 moves between the levers 13 and 15 and has an arcuate slot 21 in which a pin 22, carried by the lever 15, rides. The levers 13 and 15 are pivotally mounted on plate 4 by the common stud 23, and the lever 15 is provided with a cam surface 24 to insure that the edge 25 rides over the lever 13 in the extreme position. The spring 26 which connects the levers 13 and 15 is sufficiently strong so that as the arm 20 is moved in a counter-clockwise direction, the levers 13 and 15 are moved as a unit in a clockwise direction through the action of the pin 22 and the slot 21. As the levers 13 and 15 are moved in a clockwise direction, the surface 27 of the arm 28 on the lever 13 engages the shutter setting pin 82 and moves it through the slot 11 to its extreme position where the pin and lever 13 come to rest. The lever 15, however, because of the pin 22 engaging the slot 21 in the lever 12 continues to rotate thereby tensioning the spring 26. This overtravel permits the nose 29 on the lever 15 to engage the lug 30 on the lever 16 which is slidably mounted on the studs 31 in the plate 4. As the lever 16 is moved downward against the action of the spring 32 which has one end secured to the upturned section 33 of the lever 16, the tension spring 34, which is mounted on the lever 16 and engages the pin 72 extending through the slot 10 in the plate 4 and the slot 35 in the lever 16, moves the pin 72 downward to open the shutter leaves in the shutter assembly S. The upturned section 33 on the lever 16 is provided with an arm 36, the purpose of which will be described hereinafter. As the arm 20 of the lever 12 moves in a clockwise direction, the nose 29 leaves the lug 30 and the lever 16 is held in the blade opening position in a manner to be described hereinafter. Also, the edge 25 of the cam surface 24 abuts the lug 37 on the lever 13 and the arm 38 returns the pin 82 to its original position. It may be well to point out that the pins 81 and 82 move together since they are mounted on a common plate, as described in the second of the above-mentioned applications. When the pin 82 has been returned to its original position, the shutter has been set and is ready for release. The lever 14, which is slidably mounted on the studs 39 in the plate 4, is moved in an upward direction by a means to be described hereinafter. As the lever 14 is moved upward against the action of the spring 40, the extension 41 engages the pin 81, thereby moving it into the slot 42 and in a clockwise direction in the slot 11 to release the shutter.

The mechanism assembly D is mounted on the cover plate 45 which encloses the aperture 46 in the side of the housing 1, see Figs. 7 and 12–15. The drive mechanism comprises the single operating means or handle 47 which is mounted on the stud 48 which also carries the gear 49. The gear 49, therefore, is rotated by and has the same angular movement as the handle 47. The handle 47 is held in the forward position by the spring 50 which is attached to the gear 49. The release member 51 is located adjacent the knob 52 on the handle 47 and is pivotally mounted in the plate 45 by the stud 53 extending therethrough. The stud 53 also carries the arm 54 which is at right angles to the release member 51 so that counter-clockwise movement of the release member 51 also moves the arm 54 in the same direction. The interlock lever 55 is pivotally mounted by the stud 56 to the plate 45 and has an arm 57 which lies in the path of the lug 58 formed upon the arm 54, see Figs. 12 and 16. The second arm 59 of the lever 55 is formed so that it lies over the gear 49 and carries a pin 60 which is staked thereto, the purpose of which will be described hereinafter. The third arm 61 has a lug 62 to which is attached the spring 63, a formed up lug 64, and a tail portion 65. The gear 49 (Fig. 14) is provided with a shoulder 66, a milled recess 67, and an arcuate recess 68, as shown in Figs. 14 and 15. The recess 68 contains a leaf spring 69 which is formed up, as best shown in Fig. 15. The recess 67 contains a formed leaf spring 70 of the shape best shown in Fig. 14 which is secured to the gear 49 by the screw 71 which passes through the ear 73 and has one tail 74 extending just beyond the shoulder 66 and the other tail formed over as at 75. The hub of the gear 49 is provided with a flat surface 76 under which is secured a block 77 having milled serrations 78. The pawl 79 (Fig. 12) is pivotally mounted to the cover 45 by the stud 80 and has a sharp nose 83 which wipes over the serrations 78. The tail end of the pawl 79 is resiliently connected to the cover 45 by the spring 84 which tends to keep the pawl in the position shown in this figure. The lever 85, which is pivotally mounted on the cover 45 by the stud 86, has two bifurcated ends, one of which engages the stud 87 on the gear 49 and the other which is connected to the film advancing linkage which will be described hereinafter. The gear 49 also carries a stud 88 which engages the slot 89 in the arm 19 of the lever 12, see Figs. 9–11. The shoe 90 (Fig. 7), which operates the mirror carrier assembly, is secured to an arm 91 which in turn is connected to the gear 92 rotatably mounted on the stud 93 and is moved from the position shown in full lines to that shown by dotted lines by the intermediate gear 94 which is mounted on the stud 95 and meshes with the gear 49.

Before the handle 47 (Fig. 12) can be moved in a clockwise direction, the release member 51 must be depressed, which moves the arm 54 against the arm 57 of the lever 55, moving it in a clockwise direction. As the arm 57 is moved, the arm 61 is also rotated against the action of the spring 63 and the lug 64 is removed from the recess 67. The amount of movement is such that the lug 64 is moved beyond the tail 74 of the spring 70 which permits the tail 74 to move under the lug 64, thereby preventing it from reentering the recess 67. As the handle 47 is moved in a clockwise direction, the gear 49 is also rotated in the same direction and the lug 64 on the lever 55 rides off the tail 74 onto the shoulder 66 of the gear 49. The gear 49 as it rotates drives the gears 94 and 92 and moves the shoe 90 from the full line position to the dotted line position, as shown in Fig. 12. The movement of the handle 47 is limited by the pin 96 staked in the plate 45 and which abuts the ends of a relieved portion 97 in the periphery of the gear 49. When the gear 49 has reached the end of its travel, the lug 64 on the lever 55 will be moved in a counter-clockwise direction by the spring 63 into the arcuate recess 68.

As the direction of the handle 47 is reversed with the aid of the spring 50, the shoe 90 will be returned to its normal position, and the lug 64 will ride over the leaf spring 69 and drop off the end into the recess 67. The formed portion 75 of the spring 70 limits the action of the lug 64 inwardly as against the action of the spring 63. At the same time, the tail 74 is moved towards the wall of the recess 67, as shown in dotted lines in Fig. 14, and the leaf spring 69 prevents the lug 64 from reentering the arcuate recess 68. Before the handle 47 can again be moved, the release member 51 must be actuated.

In order to insure that the cycle of operation is completed, the pawl 79, together with the serrations 78, acts as a locking device in the event that it is attempted to reverse the direction of the handle 47 at any point intermediate its total movement in either direction. When the handle 47 is moved in a clockwise direction, the nose 83 of the pawl is rocked in a counterclockwise direction by the block 77 against the action of the spring 84. If the direction of movement of the handle 47 is reversed before reaching the end of its travel, the nose 83 is wedged into the serrations 78 and the handle is locked against movement. When the handle is brought to the limit of its movement, the nose 83 rides off the serrations 78 and is returned to its normal position by the spring 84. As the direction of movement of the handle 47 is reversed, the block 77 rocks the nose 83 in a clockwise direction so that it can wedge itself into the serrations 78 in the event that an attempt is again made to change the direction of movement before the end of the stroke is reached.

Figure 2:
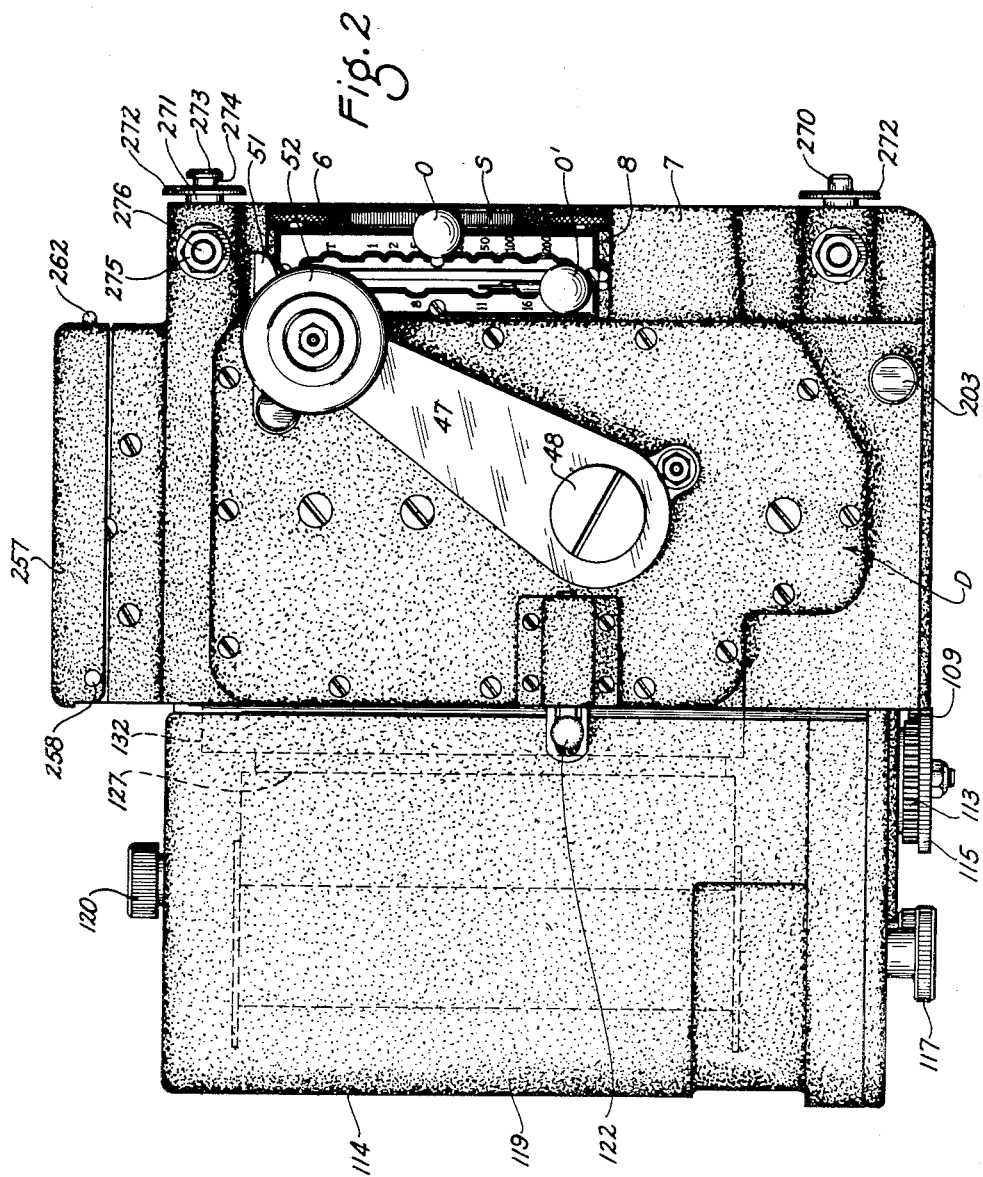
Fig. 2 is a side elevation of the right or operating side of the camera showing the film magazine attached thereto.
Figure 5:
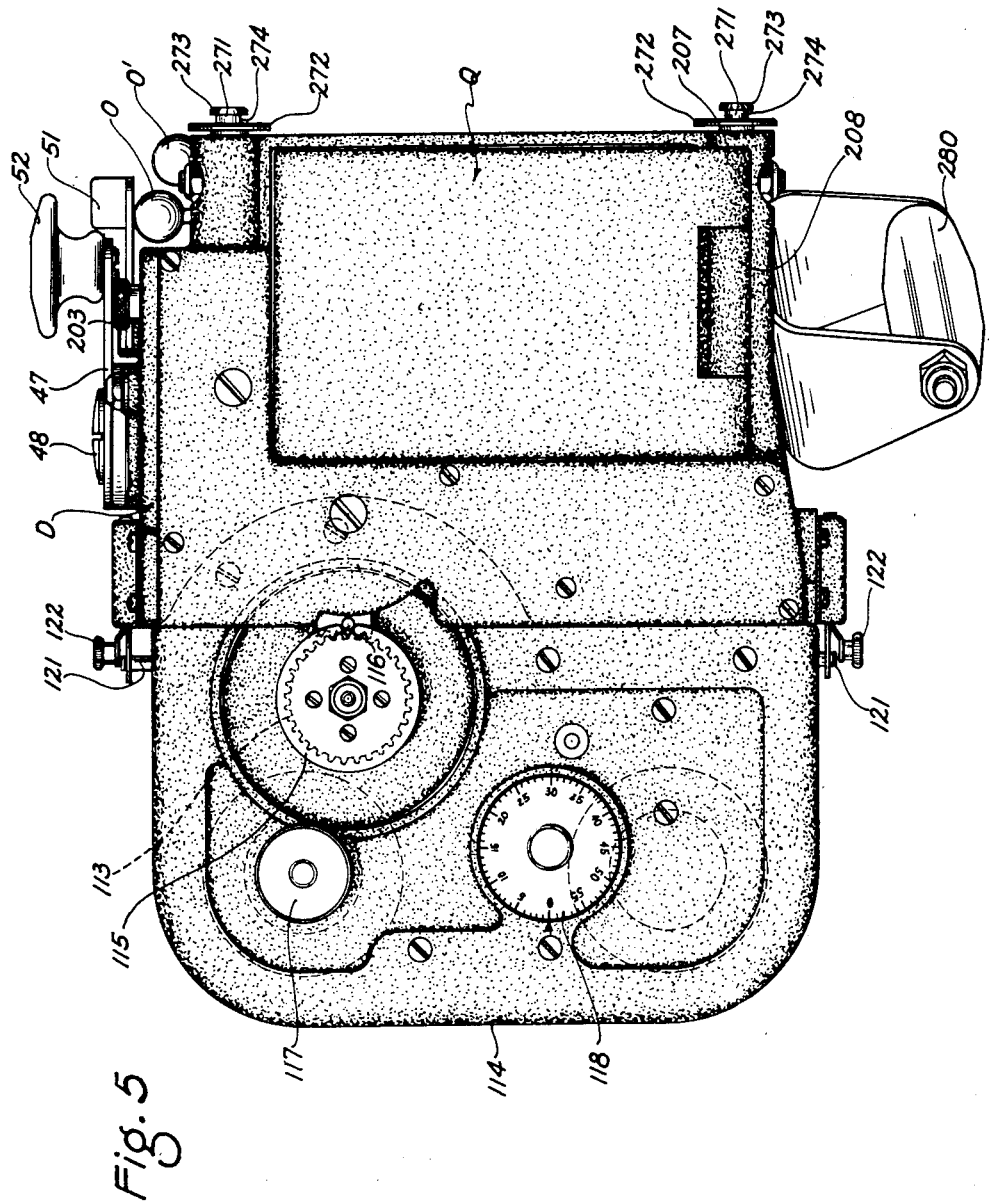
Fig. 5 is a bottom view of the camera with the film magazine attached thereto and showing the connection between the camera and magazine for advancing the film.
Figure 6:
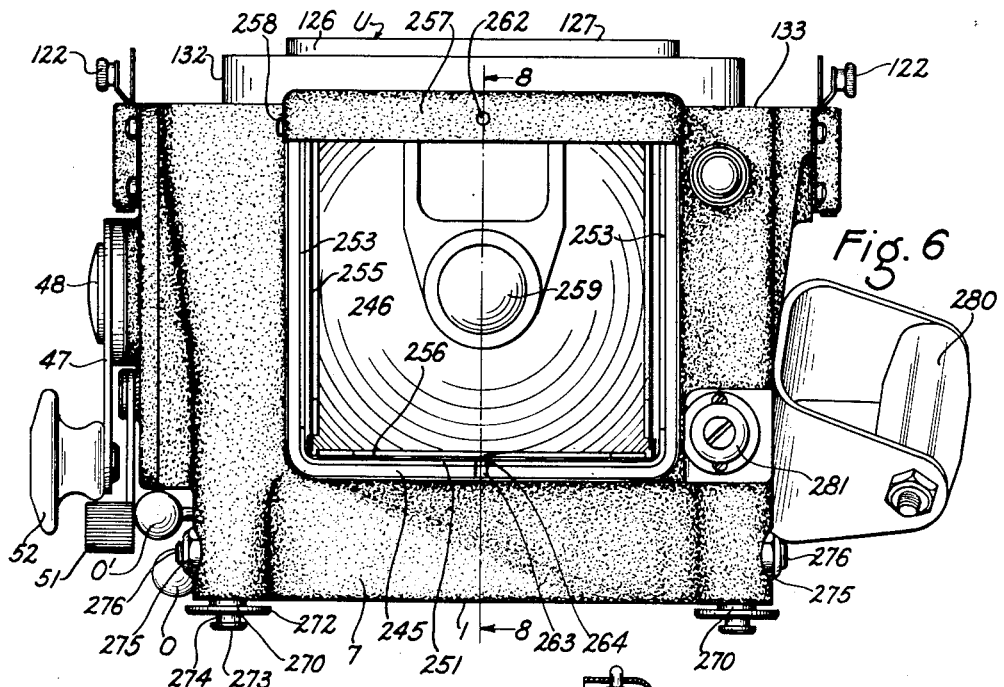
Fig. 6 is a plan view of the camera with the hood in the open or viewing position to show the shape of the field lens and the position of the magnifier.

The gear section 109 meshes with a gear 113 mounted on the magazine 114, see Figs. 2 and 5, which has attached thereto a knurled disc 115 with a notch 116 for engaging the pin 111 to insure that the magazine is in proper phase for mounting on the camera. The film magazine 114 may be of any conventional design in which the gear 113 is connected through a one-way clutch to a suitable film drive mechanism. The magazine is provided with a threading knob 117, a reset exposure indicator 118 and a suitable cover 119 which can be removed by turning the thumb knob 120. The magazine is also provided with pins 121 for securing the magazine 114 to the camera by the latches 122.

Figure 4:
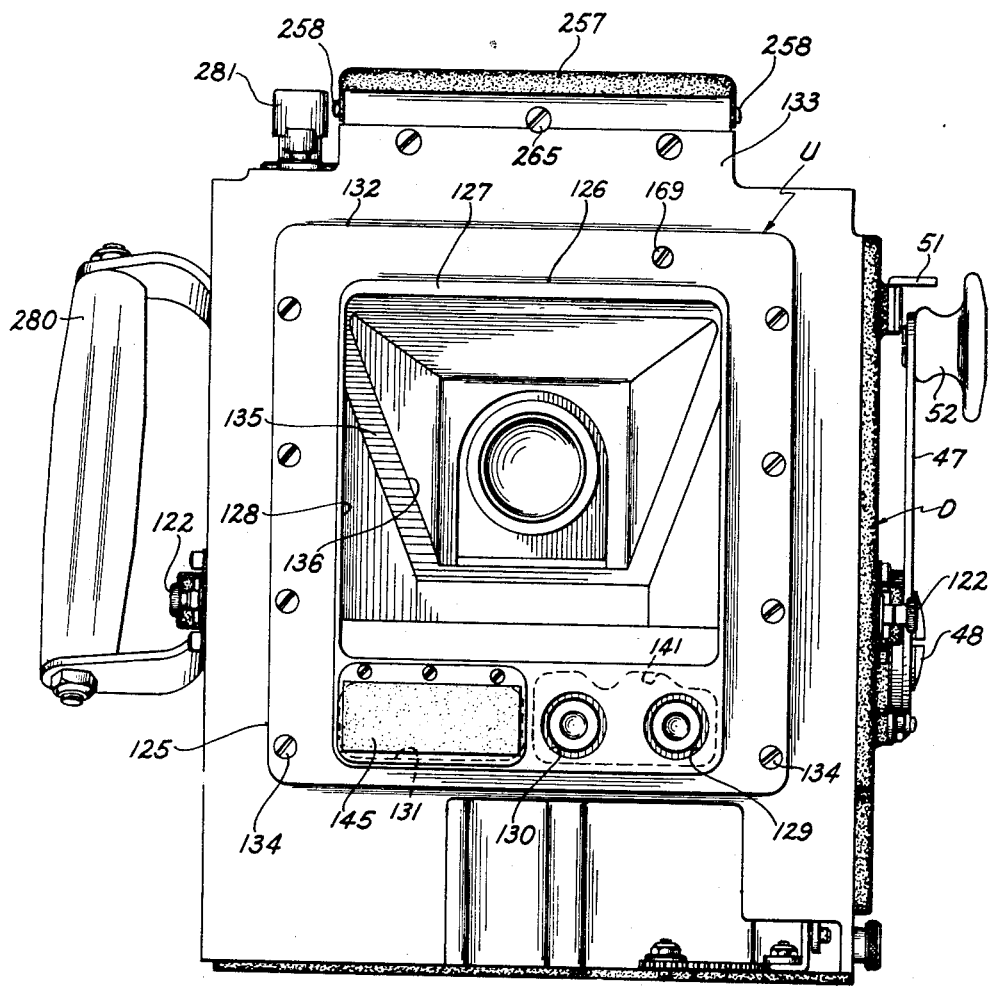
Fig. 4 is a rear elevation of the camera, showing the exposure apertures for the picture, the data, the time and the number.

The mirror supporting and locating means U, see Figs. 4 and 7, consists of a substantially triangular shaped housing 125, see Fig. 7, which has a rearward extending portion 126, the face 127 of which provides the film plane for the camera. The housing is provided with a picture aperture 128 (Fig. 4) below which are apertures 129, 130 and 131 for the counter, watch, and data recording plate, respectively. A shoulder 132 abuts the rear surface 133 of the housing 1 for locating the housing 125 which is secured in place by the screws 134. The housing 125 (Fig. 7) is provided with an inclined surface 135 which provides the means for locating the mirror assembly M with respect to the film plane and the viewing plane, and which has an aperture 136 shaped to permit the objective to fill the entire aperture 128. A recess 137 is provided at the top of the housing 125 with suitable bushings 138 mounted in the side walls thereof to receive the mirror carrier assembly M. The lower portion 139 of the housing 125 is divided into three compartments 140, 141 and 142. The first compartment 140 has the end thereof closed by the watch and counter assembly C. The compartment 141 is enclosed by the plate 143 which carries two objectives 144 and their mounts for projecting an image of the watch and counter through the apertures 129 and 130, respectively, onto the film. The compartment 142 is open to the compartment 140 and has a transparent plate 145 of glass or other suitable material over the aperture 131, said plate having its outer face finely ground to permit writing thereon with a soft lead pencil. This plate may have written thereon any pertinent data which might be desired to record with the picture. The manner in which the images of the watch and counter and the data are obtained on the film will be described hereinafter.

The mirror carrier assembly M, as shown in Figs. 17–19, comprises a first surface mirror 150 which is resiliently mounted between the tapered channel-shaped arms 151 and 152. The arms 151 and 152 are substantially U-shaped in cross section and retain the mirror 150 and the light shield 153 in position by means of the angular extensions 154 and 155 and the formed up ears 156. The mirror 150 and the light shield 153 rest on a strip of felt 157 or some similar cushioning material which is secured to the lower section of the arms 151 and 152, see Figs. 18 and 19, and are held against the lower section by the leaf springs 158 secured to the upper section of the arms 151 and 152. The arms 151 and 152 are secured to the spacer member 159 by the extensions 160 and tails 161 which may be soldered or welded thereto. The spacer member 159 is composed of two sections 162 and 163 which are provided with spring-pressed 164 which seat themselves in the bushings 138 in the housing 125 to provide a pivotal mount for the mirror carrier assembly M. The section 162 is provided with a portion 165 of reduced section to receive a coil spring 166 and a groove 167 which engages the tongue 168 on the section 163. The spring 166 has one end anchored to the section 165 and the other end abuts the end of a screw 169 in the bottom of the recess 137, see Figs. 4 and 7.

In order to prevent extraneous light from fogging the film by leaking around the aperture 136 in the housing 125 or through scratches in the back of the mirror 150 (Fig. 19), the light shield 153 is composed of two members which are soldered or welded together. The plate 170 has a relieved section 171 of the general shape of the aperture 136 in the housing 125 with a flange 172 upon which the mirror rests and an antireflection baffle 173 formed up from the front edge thereof. The baffle 174 extends around three sides of the section 171 and into the housing 125, as shown in Figs. 7 and 19, and is provided with a cut-out portion 175 in the front face for the objective. The arm 151 and the extension 154 have lugs 176 and 177 formed outwardly therefrom the purpose to be described hereinafter.

The batteries 197 are connected in series having one end of the circuit grounded and the other connected to one side of the line for the lamps 198 which are in parallel. The other side of the lamps are connected to a terminal strip of a switch means, not shown, which is actuated by the mirror assembly M. A standard make-break switch is mounted on the top wall of the housing 1 and has a single lead which is also connected to said terminal strip to permit the operator to complete the circuit through the lamps in order to illuminate the compartment 140 for setting the watch 127 and for testing the lamps 198.

The battery and lamp assembly Q is pivotally mounted to the housing 1 by the pin 202, see Figs. 1 and 20, and is held in position by the spring-pressed plunger member 203 which engages the aperture 204 in the upright lug 205 on the cover 206. The cover 206 is provided with extensions 207 which staddle the boss 208 on the housing 1 and which together with the pin 202 provides the means of hinging the cover 206 to the housing 1. The cover 206 is provided with a recess 209 in which a layer of insulating paper 210 and an insulating plate 211 of phenolic or some other suitable insulating material are secured by any suitable means, such as rivets. The batteries 197, which are of the standard flash light type, are held in position by the spring clips 212 which are secured to the plate 211 by the rivets 213 and are of the shape best shown in Fig. 21. The terminals 214 are also riveted to the plate 211 by means of the rivets 215 and are connected in series by the connector strips 216. The lamps 198 are connected in parallel and have one side of the line connected to the battery terminal opposite that which is connected to ground. One end of the battery circuit is connected to ground by means of the strip 217 which is secured to the cover 206 by the rivet 218. The lamps 198 are mounted in a standard receptacle 219 which are clipped to the L-shaped members 220 and 221 which are also secured to the plate 211.

With reference to Figs. 7 and 21, it will be noted that one lamp is mounted above the other two and extends into the compartment 140; this is necessary in order to obtain even illumination in the compartment 142 to expose the data on the plate 145. The three lamps together, however, provide a general illumination of the compartment 140 which is sufficient to obtain a good exposure of the watch and counter, the images of which are projected onto the film by the objectives 144.

The watch and counter assembly C, see Figs. 22 and 23, comprises a plate 225 which is secured to the lower portion 139 of the housing 125 and on which the watch 227 and counter 228 are mounted. The watch 227 is located on the plate 225 by means of the stud 229 and the locating pin 230, which are integral parts of the watch, and secured by the nut 231. The counter 228 is mounted on the studs 232, see Fig. 23, and spaced from the plate 225 by the bushings 233 so that the face of the watch and the numbers on the counter are substantially in the same plane. A shield 234 is placed over the counter 228 in order to prevent light from leaking through the aperture 235 cut in the plate 225 for receiving the counter and has an extension 236 which also covers a cut out portion 237 in the wall of the compartment 140 which permits the operating arm 238 of the counter 228 to extend therethrough.

The portion 239 of the plate 225 which extends above the lower portion 139 of the housing 125 acts as a baffle to prevent extraneous light which may be reflected off the plate 4 from fogging the film. A tail 240 on the plate 225 rests on a layer of plush 241 which is secured to the ledge 242 of the housing 1 to make the battery compartment 243 in the housing 1 and compartment 140 light tight, see Fig. 7.

Figure 3:
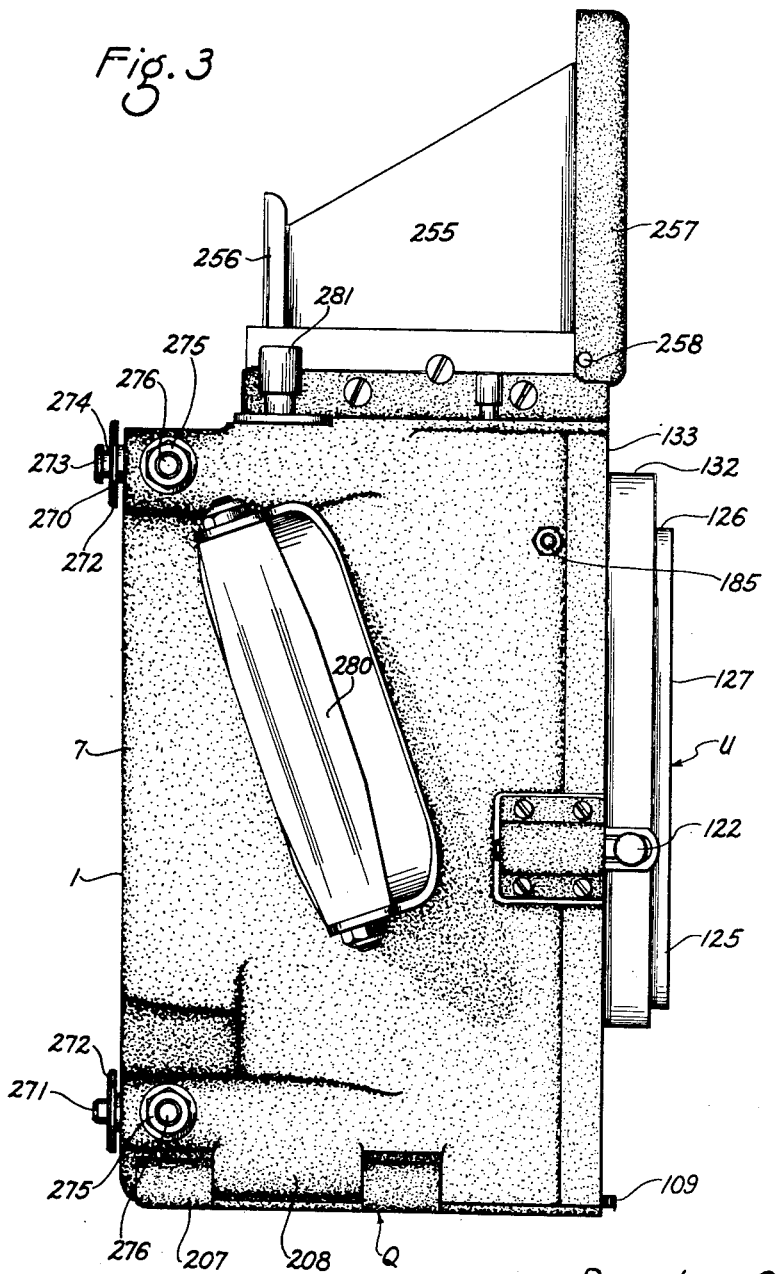
Fig. 3 is a side elevation of the left side of the camera with the hood in the open or viewing position.
Figure 8:
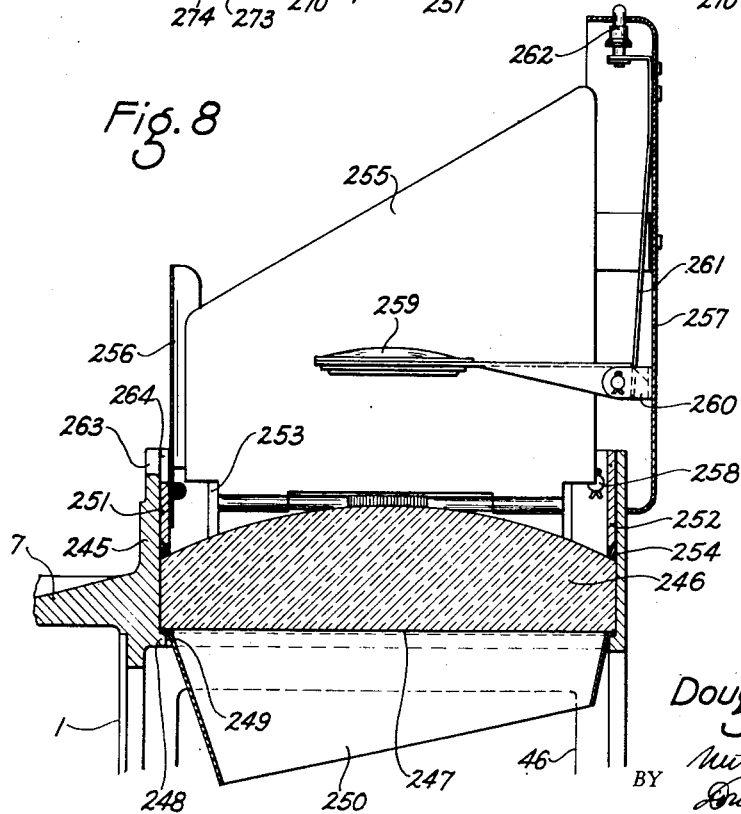
Fig. 8 is a partial vertical section taken on the line 8—8 of Fig. 6, showing the structure of the hood.

The upper surface of the housing 1, see Fig. 8, is provided with a rectangular extension 245 in which is mounted the field lens 246 for viewing the field. The relation of the field lens 246 to the camera objective is the same as that of the camera objective to the film plane 127. A field lens of the type shown in Figs. 7 and 8 is provided in order to give the operator as bright an image as possible. The field lens has a plano surface 247 which lies in the focal plane of the camera objective and which is fine ground and therefore acts as a ground glass surface. A ledge 248 in the top of the housing 1, see Fig. 8, provides an aperture 249 into which a light shield 250 extends. The light shield rests on the ledge 248 with the field lens 246 mounted thereover. The light shield 250 prevents any extraneous light entering the field line 246 from being reflected off the internal mechanism and into the aperture 136, thereby fogging the film. The field lens 246 is retained in position by the channel-shaped plates 251 and 252 and the side plates 253, the inner edges of which conform to the curvature of the field lens 246. A gasket 254 is placed between the plates and the lens to prevent the seepage of water, moisture, dust or dirt from around the lens into the camera body. The side plates 253 have mounted thereon a plate 255 which is hinged to the side plate and resiliently held in an upright position, as indicated in Figs. 3 and 8. In a like manner, the plate 256 is resiliently hinged on the plate 251. The cover 257 is pivotally mounted on the extension 245 at 258. The cover 257 carries a magnifying lens 259 which is pivotally mounted on the bracket 260 which is secured to the under side of the cover 257. A leaf spring 261 holds the magnifier in its viewing and folding position, as shown in Figs. 7 and 8, and also carries the catch member 262 which in cooperation with the slots 263 and 264 in the extension 245 and the plate 251, respectively, serve to lock the cover in the closed position, as shown in Figs. 1, 2, 4 and 7.

The camera is mounted by means of the studs 270 and 271. All the studs are provided with flanges 272 whereas only the studs 270 are provided with the heads 273 to form the grooves 274. The grooves 274 are designed to enter slots in a plate which is mounted on a suitable support, whereas the studs 271 merely enter locating holes in said plate. The camera is adjusted with respect to the support by means of the studs 270 and 271 which, by loosening of the nuts 275 on the studs 276, releases the studs to permit moving the camera in or out thereon for proper focusing. The plate to which the camera is mounted also provides for both vertical and horizontal adjustments so that the optical center line of the camera and its support can be accurately adjusted.

The camera is also provided with a handle 280 which permits the camera to be easily transported by hand as well as for lifting it from its carry case for mounting on its support.

With reference to Fig. 7, the various assemblies are shown in their proper relationship to each other, and from the position of the parts, it will be noted that the mirror carrier assembly M is in a viewing position. With the mirror assembly M in the viewing position, the shutter has been set and an unexposed area of film may be assumed to be in position. Under normal operating conditions the cover over the field lens would be open, in a manner shown in Figs. 3 and 8.

With the shutter S in the set position, the linkage assembly L assumes the position shown in Fig. 9 with the exception of the lever 16 which is held in its lowest position to maintain the shutter leaves in an open position against the action of the spring 32 by the lug 177 on the arm 151. The mirror carrier assembly M is held in the position shown in Fig. 7 by the engagement of the pin 60 with the lug 176 on the arm 151.

When the release member 51 is moved in a counter-clockwise direction by the operator, the arm 54 strikes the arm 57, thereby rocking the lever 55 as a unit which causes the arm 59 to move in a clockwise direction, thereby removing the pin 60 from the lug 176 to release the mirror carrier assembly M. At the same time the lug 64 on the lever 55 is moved out of the recess 67, as described above. As the mirror carrier assembly M is released by the pin 60, the spring 166 which has been wound up seeks to return the assembly as a unit to a position adjacent the lower edge of the light shield 250. The first portion of this movement releases the tension of the springs 158 on the mirror 150 and permits the lug 177 to move away from the arm 36 on the lever 16 so that it can return to the position shown in Fig. 9, thereby closing the shutter leaves, as described above, before the mirror 150 and plate 170 leave the inclined surface 135 of the housing 125. After the arms 151 and 152 have picked up the mirror 150 and plate 170, the assembly moves as a unit to its light blocking position under the shield 250.

As the mirror carrier assembly is released and starts to move upward, the lamps 198 are illuminated. The general illumination of the compartment 140 of the housing 125 by the lamps 198 permits the objectives 144 to project images of the watch 227 and counter 228 onto the unexposed film. In a similar manner, the one lamp that extends above the other two provides direct illumination for exposing the data on the plate 145 to the film. Just before the mirror carrier assembly M reaches the end of its upward movement and before the shutter is tripped, the lamp circuit is broken. The interval during which the lamps are lit is of sufficient duration to permit a good exposure of the watch, counter, and data.

The shutter release lever 14 is provided with an extension 43 which is covered with a soft rubber sleeve 44 and which lies in the path of the arm 152 of the mirror carrier assembly M. As the mirror carrier assembly nears the end of its upward movement, the extension 154 strikes the extension 43 to move the lever 14 vertically against the action of the spring 40. In its upward movement, the extension 41 engages the pin 81 to move it into the slot 11 to trip the shutter. The lever 14, together with the pins 81 and 82, is held in its upper position until the mirror carrier assembly M is again started on its downward movement toward its viewing position. The first portion of this movement allows the lever 14 and the pins 81 and 82 to return to the positions shown in Fig. 9 so that the pin 82 may be picked up by the arm 27 to set the shutter as described herein above. When the shutter is set on "Time," the blades remain open until a spring-pressed plunger 281, having an extension projecting therefrom and which engages the extension 43, is actuated by the operator to close the shutter blades. At this time, the mirror 150 is moved a small distance from the shield 250 and the lever 14 and pin 81 are returned to their original position.

With the mirror in its inoperative position, the shutter released, and the lamp circuit open, the camera is now ready to have an unexposed area of film wound into place. As the handle 47 is moved in a clockwise direction, the gears 49, 94 and 92 are also rotated and the shoe 90 is brought into engagement with the arm 151 of the mirror carrier assembly M. The first portion of the movement of the mirror carrier assembly is very rapid and is changed to a sinusoidal movement as the mirror 150 and the plate 170 approach the inclined surface 135. After the mirror and plate 170 have been seated on the inclined surface 135, the continued movement of the shoe 90 moves the arms 151 and 152 from the position shown in Fig. 19 to that shown in Fig. 7, thereby compressing the springs 158 and insuring that the mirror 150 and plate 170 are firmly seated on the inclined surface 135. When the shoe 90 has reached the end of its travel, which is determined by the pin 96 riding in the cut out portion 97 of the gear 49, the lug 176 will be in a position to be held by the pin 69 which will be brought into a locking position when the lug 64 rides off the shoulder 66 and enters the recess 68 through the action of the spring 63, as described herein above.

The movement of the handle 47 through the gear 49 which carries the stud 88 also provides the means for setting the shutter. The stud 88 engages the slotted arm 19 of the actuating lever 12 to rotate it in a counter-clockwise direction as the handle 47 moves in a clockwise direction. As described herein above, this action serves to set the shutter. Also, after the mirror 150 and plate 170 have been seated on the inclined surface 135, the additional movement of the arms 151 and 152 serves as the movement for opening the shutter blades for viewing by the action of the lug 177 engaging the arm 36 on the lever 10 to move it in a downward direction.

The lever 85 which is pivoted to the cover 45 at 86 is actuated by the stud 87 on the gear 49 to operate the film advancing mechanism in the magazine 114. As the gear 49 rotates in a clockwise direction, the lever 85 moves a lever towards the rear of the camera to rotate the sector 109 thereby rotating the gear 113 which is connected to the film advancing mechanism in the magazine 114. As said lever moves towards the rear of the camera, the arm 238 of the counter is actuated through the spring connection 283. The film advancing mechanism is actuated when the gear 113 is rotated in a counter-clockwise direction, see Fig. 5. Therefore, an unexposed area of film is wound into position during the forward or return stroke of the handle 47.

During the forward or return stroke of the handle 47, the mirror carrier assembly M is held in its viewing position by the pin 60, the shoe 90 is returned to its original position, as shown in Fig. 12, and the lug 64 on the lever 55 is held against the formed portion 75 of the spring 70, as described herein above. The forward stroke of the handle 47 also returns the arm 19 and, hence, the levers 12, 13 and 15 to the positions shown in Fig. 9, after having set the shutter in a manner previously described.

When the handle 47 reaches the end of its return stroke, the parts are once again in the position shown in Figs. 7, 9, and 12 and the camera is ready for another exposure, upon actuation of the release member 51. It can be readily appreciated that in my camera a multiplicity of operations are performed in their proper sequence of operation with a minimum number of controls, namely, the single operating means or handle in cooperation with the mirror carrier mechanism.

While I have described and illustrated a preferred embodiment of my invention, it is obvious that changes can readily be made therein without departing from my invention, as defined in the following claims.

I claim:

1. In a reflex camera, the combination with a camera body, an objective, an exposure frame axially aligned with the objective, a focusing screen arranged transversely with respect to the objective and exposure frame, of a mirror swingably mounted between the objective and exposure frame, a frame carrying the mirror, spring members on said frame tending to normally hold the mirror against one side of the frame, mirror locating pads on the camera body, and means for sinusoidally lowering the mirror into its operative and focusing position behind the objective and upon the locating pads by moving the frame carrying the mirror whereby said spring members permit said mirror to move away from said frame upon contact with said pads for holding the mirror flat thereagainst.

2. In a reflex camera, the combination with a camera body, an objective, an exposure frame axially aligned with the objective, a focusing screen arranged transversely with respect to the objective and exposure frame, of a mirror swingably mounted between the objective and exposure frame, a frame carrying the mirror including channel arms hingedly attached to the camera, each of said channels being materially wider than the thickness of the mirror, spring means on one side of said channels for resiliently retaining the mirror in the channel arms and against the other side of said channels, mirror locating pads on the camera body, and means for lowering the arms and mirror into focusing position on the locating pads and for compressing the spring means between the channel arms and mirror to maintain said mirror against said pads and away from the other side of said channels in the focusing position.

3. A reflex camera as defined in claim 2, characterized by the channel arms, increasing in width from the hinge end outwardly.

4. A reflex camera as defined in claim 2, characterized by the channel arms, increasing in width from the hinge end outwardly, and by the narrowest portion of the channel arms being materially wider than the thickness of said mirror.

5. In a reflex camera, the combination with a camera body, an objective, an exposure frame and a focusing screen carried by the camera body, of a mirror movably mounted to move between an operative focusing position and an inoperative or picture-taking position, a mirror moving member, a pivoted lever carried by the camera body, means for operably connecting the lever and the mirror moving member for movement to set the said means including a disk movable with the lever and including a guideway, a pivoted mirror latch including a latching element, an operating arm and a lug adapted to move in the guideway, the shape of the guideway holding the pivoted mirror latch against releasing movement except when the mirror is in its focusing position.

6. In a reflex camera, the combination with a camera body, an objective, an exposure frame and a focusing screen carried by the camera body, of a mirror movably mounted to move between an operative focusing position and an inoperative or picture-taking position, a mirror moving member, a pivoted lever carried by the camera body, means for operably connecting the lever and the mirror moving member for movement to set the said means including a disk movable with the lever and including a guideway, a pivoted mirror latch including a latching element, an operating arm and a lug adapted to move in the guideway, the guideway comprising means for defining an endless path including guideways, one inside the other connected at their ends, and a spring for holding the lug on the pivoted mirror latch against the means for defining the endless path.

7. In a reflex camera, the combination with a camera body, an objective, an exposure frame and a focusing screen carried by the camera body, of a mirror movably mounted to move between an operative focusing position and an inoperative or picture-taking position, a mirror moving member, a pivoted lever carried by the camera body, means for operably connecting the lever and the mirror moving member for movement to set the said means including a disk movable with the lever and including a guideway, a pivoted mirror latch including a latching element, an operating arm and a lug adapted to move in the guideway, the guideway comprising means for defining an endless path including guideways, one inside the other connected at their ends, a spring for holding the lug on the pivoted mirror latch against the means for defining the needless path, and means for manually moving the pivoted mirror latch to move the said lug at one end of the guideway when the mirror is released.

8. In a reflex camera, the combination with a camera body, an objective, an exposure frame and a focusing screen carried by the camera body, of a mirror movably mounted to move between an operative focusing position and an inoperative or picture-taking position, a mirror moving member, a pivoted lever carried by the camera body, means for operably connecting the lever and the mirror moving member for movement to set the said means including a disk movable with the lever and including a guideway consisting of a pair of arcuate shaped guides, one inside of the other with openings connecting the guides at the ends, a pivoted mirror latch including a lug spring pressed against the guides and toward the inner guideway whereby the pivoted mirror latch may move through a cycle, and manually operable means for moving the pivoted mirror latch lug from the inner to the outer guides and to simultaneously release said mirror.

9. In a reflex camera, the combination with a camera body, an objective, an exposure frame and a focusing screen carried by the camera body, of a mirror movably mounted to move between an operative focusing position and an inoperative or picture-taking position, a mirror moving member, a pivoted lever carried by the camera body, means for operably connecting the lever and the mirror moving member for movement to set the said means including a disk movable with the lever and including a guideway consisting of a pair of arcuate shaped guides, one inside of the other with openings connecting the guides at the ends, a pivoted mirror latch including a lug spring pressed against the guides and toward the inner guideway whereby the pivoted mirror latch may move through a cycle, and manually operable means for moving the pivoted mirror latch lug from the inner to the outer guides and a spring in the opening at one end of the guides through which the lug is manually moved for preventing the lug from moving in a reverse direction through the said opening.

10. In a reflex camera, the combination with a camera body, an objective, an exposure frame and a focusing screen carried by the camera body, of a mirror movably mounted to move between an operative focusing position and an inoperative or picture-taking position, a mirror moving member, a pivoted lever carried by the camera body, means for operably connecting the lever and the mirror moving member for movement to set the said means including a disk movable with the lever and including a guideway consisting of a pair of arcuate shaped guides, one inside of the other with openings connecting the guides at the ends, a pivoted mirror latch including a lug spring pressed against the guides and toward the inner guideway whereby the pivoted mirror latch may move through a cycle, and manually operable means for moving the pivoted mirror latch lug from the inner to the outer guides, a one-way spring latch in the inner guideway including a latching flange at the end thereof for holding the said movable disk against reverse movement until said lug is manually moved to release the mirror latch.

11. In a reflex camera, the combination with a camera body, an objective, an exposure frame and a focusing screen carried by the camera body, of a mirror movably mounted to move between an operative focusing position and an inoperative or picture-taking position, a mirror moving member, a pivoted lever carried by the camera body, means for operably connecting the lever and the mirror moving member for movement to set the said means including a disk movable with the lever and including a guideway consisting of a pair of arcuate shaped guides, one inside of the other with openings connecting the guides at the ends, a pivoted mirror latch including a lug spring pressed against the guides and toward the inner guideway whereby the pivoted mirror latch may move through a cycle, and manually operable means for moving the pivoted mirror latch lug from the inner to the outer guides, a one-way spring latch in the inner guideway including a latching flange at the end thereof for holding the said movable disk against reverse movement until said lug is manually moved to release the mirror latch, and a second spring lying in the opening through which the lug may be manually moved, and adapted for compression as the lug is manually moved for preventing the lug from moving in a reverse direction through the opening through which the lug is manually moved whereby said lever may move said disk in one direction to reset said mirror.

12. For use in a reflex camera of the type including a camera body, an objective, an exposure frame, a focusing screen and a mirror mechanism for moving the mirror to and from an operative focusing position, a pivotally mounted mirror control disk having means for defining an endless path, one portion lying inside the other and connected at the ends, a lug carried by the mirror mechanism and adapted to move through the endless path, means for manually moving the control disk, a spring for moving the lug through one of the endless path connected ends, and manual means for moving the lug through the other connected end of the endless path whereby said lug carried by the mirror mechanism may be controlled by the endless path of the control disk.

13. For use in a reflex camera of the type including a camera body, an objective, an exposure frame, a focusing screen and a mirror mechanism for moving the mirror to and from an operative focusing position, a pivotally mounted mirror control disk having means for defining an endless path, one portion lying inside the other and connected at the ends, a lug carried by the mirror mechanism and adapted to move through the endless path, means for manually moving the control disk, means for preventing movement of the disk in one direction until said disk has moved a predetermined distance in the other direction, a spring for moving the lug through one of the endless path connected ends, and manual means for moving the lug through the other connected end of the endless path whereby said lug carried by the mirror mechanism may be controlled by the endless path of the control disk.

14. In a reflex camera, the combination with a camera, an objective, an exposure frame, and a focusing screen carried by the camera body, of a mirror including a mounting frame and adapted to be moved between an operative focusing position and an inoperative picture-taking position, an actuating means pivotally mounted on said camera body and having an operating stroke and a return stroke, a mirror moving means adapted to engage said frame for moving said mirror and frame sinusoidally from the inoperative to the operative position on the operating stroke of said actuating means, drive means operably connecting said actuating means and mirror moving means, a disk member having a guideway therein and adapted to be moved with said actuating means, a latch means having one portion adapted to engage said guideway at the end of the operating stroke and during the return stroke of said actuating means and a portion adapted to engage said frame at the end of the operating stroke of said actuating means for holding said frame and mirror in the operative position, resilient means for maintaining said latch means in the guideway, and means adjacent said actuating means for releasing said latch means to permit said frame and mirror to return to the inoperative position.

15. In a reflex camera, the combination with a camera, an objective, an exposure frame, and a focusing screen carried by the camera body, of a mirror including a mounting frame resiliently mounted in said camera body and adapted to be moved between an operative focusing position and an inoperative picture-taking position, an actuating means pivotally mounted on said camera body and having an operating stroke and a return stroke, a mirror moving means including an oscillatable shoe adapted to engage said frame for moving said mirror and frame at a decelerating rate from the inoperative to the operative position on the operating stroke of said actuating means, drive means operably connecting said actuating means and said mirror moving means including a gear train for rotating said shoe in the same direction as said actuating means, a disk member adapted to rotate with said actuating member and including a guideway therein, a latch means pivotally mounted in said camera body and having one arm with a lug thereon for engaging said guideway at the end of the operating stroke and during the return stroke of said actuating means and a second arm for engaging said frame at the end of the operating stroke of said actuating means for holding said frame and mirror in the operative position; resilient means for maintaining said latch means in the guideway, and means on said body cooperating with said disk member for insuring completion of both the operating and return strokes of the actuating means.

16. In a reflex camera, the combination with a camera body, an objective, an exposure frame, and a focusing screen carried by the camera, of a mirror including a mounting frame and adapted to be moved between an operative focusing position and an inoperative picture-taking position, an actuating means pivotally mounted on said camera body and having an operating stroke and a return stroke, a mirror moving means adapted to engage said frame for moving said mirror and frame sinusoidally from the inoperative to the operative position on the operating stroke of said actuating means, drive means operably connecting said actuating means and mirror moving means, a shutter of the type having blades, a setting pin, a release pin, and a blade opening pin, a support means for said shutter, a disk member adapted to be moved with said actuating means, shutter setting means pivotally mounted on said support means and operably connected to the shutter setting pin and disk member for setting said shutter on the operating stroke of said actuating means, blade opening means on said support means operably connected to said blade opening pin and adapted to be actuated by said frame at substantially the end of its movement to the operative position to hold said blades in an open position for focusing and to permit said blades to return to their normally closed position as said frame and mirror return to their inoperative position; and shutter release means mounted on said support means for engaging the shutter release pin and adapted to be actuated by said frame as said frame and mirror approach the inoperative position.

DOUGLASS C. HARVEY.

(References on following page)

REFERENCES CITED

The following references are of record in the file of this patent:

UNITED STATES PATENTS

| Number | Name | Date |
|---|---|---|
| 578,639 | Holst | Mar. 9, 1897 |
| 816,907 | Garfield | Apr. 3, 1906 |
| 932,392 | Hutchings | Dec. 30, 1919 |
| 1,326,379 | Thompson | Dec. 30, 1919 |
| 2,136,143 | Nuchterlein | Nov. 8, 1939 |
| 2,165,903 | Nuchterlein | July 11, 1939 |
| 2,352,177 | Bolsey | June 27, 1946 |

FOREIGN PATENTS

| Number | Country | Date |
|---|---|---|
| 15,163 | Great Britain | of 1889 |
| 454,450 | Germany | Jan. 9, 1928 |